United States Patent [19]
Johansson

[11] 3,733,606
[45] May 15, 1973

[54] CAMOUFLAGING MEANS FOR PREVENTING OR OBSTRUCTING DETECTION BY RADAR RECONNAISSANCE

[75] Inventor: Sven-Goran Johansson, Upplands Vasby, Sweden

[73] Assignee: Barracudavwrken AB, Skarsnasvagen 4, Djursholm, Sweden

[22] Filed: Apr. 6, 1971

[21] Appl. No.: 131,652

Related U.S. Application Data

[63] Continuation-in-part of Ser. No. 812,414, April 1, 1969, abandoned.

[30] Foreign Application Priority Data

Apr. 1, 1968 Sweden..........................4293/68
Aug. 13, 1968 Sweden........................10897/68

[52] U.S. Cl. .................................................343/18 A
[51] Int. Cl. ....................................................G01s 7/36
[58] Field of Search......................................343/18 A

[56] References Cited

UNITED STATES PATENTS

| 3,315,259 | 4/1967 | Wesch | 343/18 A |
| 1,990,649 | 2/1935 | Ilberg | 343/18 A |
| 3,152,328 | 10/1964 | McMillan | 343/18 A |
| 2,771,602 | 11/1956 | Kuhnhold | 343/18 A |
| 3,069,796 | 12/1962 | Ruter | 343/18 A |
| 3,454,947 | 7/1969 | Wesch et al. | 343/18 A |
| 2,764,743 | 9/1956 | Robertson | 343/18 A |
| 2,877,286 | 3/1959 | Vance et al | 343/18 A |

Primary Examiner—Robert F. Stahl
Assistant Examiner—G. E. Montone
Attorney—Pierce, Scheffler & Parker

[57] ABSTRACT

Camouflage means for minimizing detection of objects by radar reconnaissance consisting of a multi-layered material both absorbing and reflecting radar signals and wherein at least one layer is a thin inhomogeneous electrically conductive film having a surface resistivity such as to establish reflection for a portion of the incident radar power. The conductive film may take the form of metallic grid which may be regular or irregular, metal or metallized fibers and fibrils, flakes, or a layer of colloidal, conductive particles.

14 Claims, 7 Drawing Figures

Patented May 15, 1973 3,733,606
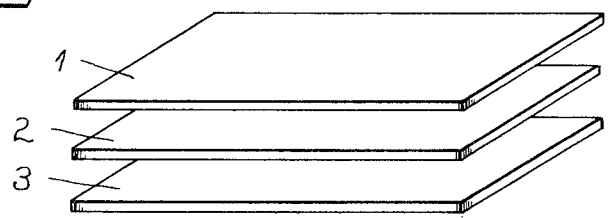
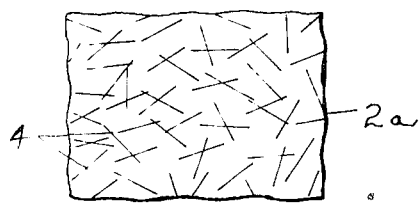
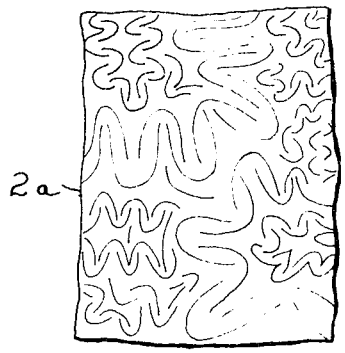
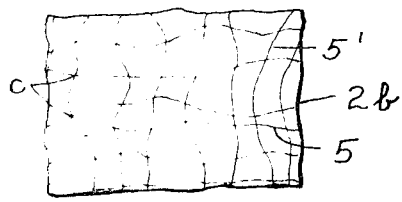
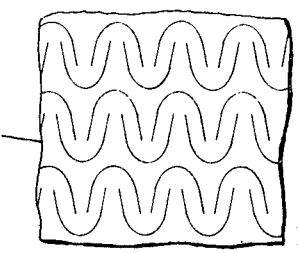
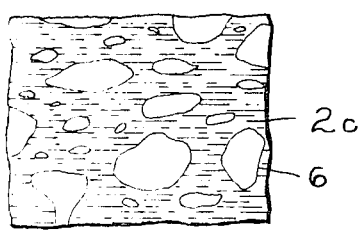
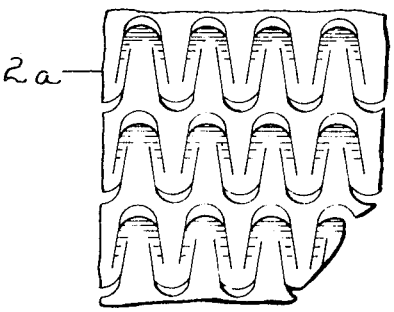

CAMOUFLAGING MEANS FOR PREVENTING OR OBSTRUCTING DETECTION BY RADAR RECONNAISSANCE

The present invention relates to an improved camouflage for minimizing detection of objects by radar reconnaissance which comprises a multi-layered material effective to both absorb and reflect radar signals and is a continuation-in-part of application Ser. No. 812,414, now abandoned, filed Apr. 1, 1969.

When using flexible camouflaging sheets, foils, nets or the like, a three-dimensional form and appearance is desirable, and various designs are known to obtain an optically three-dimensioned effect. This effect is essential when the camouflaging means is, or becomes glossy to some extent, but also because the optical appearance of a two-dimensional means having two co-planar surfaces such as a normal tarpaulin or cover fabric varies with the angle of incident visible or invisible light and with the angle of viewing the camouflaged object.

As reconnaissance frequency is dynamic such as from aircraft, armored cars, ships and even satellites, and as stereoscopic cameras or stereoscopic spy-glasses and telescopes are used, camouflaging means having a plain two-dimensional surface are unsatisfactory in most cases, though not always. The distance and depth of three-dimensional variations of the known optically camouflaging surface is, of course, an extremely high multiple of the wavelength of light, and it is probably for this reason that it was not recognized hitherto that such variations may be used for enhancing the radar camouflaging effect of radar camouflage too. If the said distance and/or depth is non-negligible with respect to, for example, one tenth of the radar wavelength but is not, on the other hand, a very high multiple thereof, several useful effects are obtained. Inter-reflection and widely differing angles of both incident and reflected waves will occur, and this involves also repeated absorption. Furthermore, the effective thickness of the camouflage cover is several orders higher than that of the camouflage sheet per se and may be related with the radar wavelength band, or even, say with the whole EHF (centimeter) wave band, such that there are quite a number of discrete projecting cut-out areas having a maximum dimension of, say, one-half, or one-quarter of the wavelength of the incident radiation, or more.

The above combination of optical and radar camouflage is obtained in a satisfactory manner by cutting and extending any of the flexible camouflaging means described in the present specification such that it has the form of so-called extended sheet material, and it is particularly advantageous to combine the present invention with that described in U.S. Pat. specification No. 3,069,796 granted Dec. 25, 1962 to R.G. Ruter. Expanded sheets are normally produced by the cutting of suitably disposed slits into sheets of camouflaging material and applying a pull to obtain an integral three-dimensional structure from a two-dimensional sheet.

If the radar-camouflaging layer of a camouflage means consists of a coherent electrically conductive layer such as fine metallic film, or grid, or a layer of collodial carbon or graphite particles which are not insulated from one another, the effect of such a layer can be considerably modified or altered by cutting because resonant, capacitive and inductive impedance components and, of course, also resistive components are introduced so that both broad-band characteristics and increased desirable losses of radar energy are obtained by dielectric and directly resistive losses.

The above effect is obtained also if said layer comprises a conductive grid, or net, or more or less resonant metal filaments, loops, fibers or fibrils. Such conductive means are normally made such that a considerable part of the meshes, fibers or fibrils are resonant at a given radar frequency, another part is resonant for another radar frequency, etc., so that such layer is highly reflective and, thus, less suitable as an absorbing means. On the other hand, a fraction of the number of fibers or meshes should be resonant and a substantial part of the remainder should provide reactance components. This desirable characteristic may be obtained or improved by the above cutting. When using metal flakes, discrete metallized areas, fibers, or fibrils, or metallized fibers or fibrils of a synthetic plastic material such as polyester or polyamide, a similar effect may be obtained, and frequently will be automatically obtained during production or use, by irregular breaking of the fibers or the metallized layer of plastic fibers, respectively.

It should be noted that the conductive meshes or similar structures may be produced by so-called printing techniques or any other known method of applying thin metal layers in regular, or preferably, irregular patterns.

If, for one reason or another, the camouflaging sheet should not be cut, and if the meshes, flakes, metallized areas, or fibers are of a size such that resonance effects are obtained, i.e. if the size is not negligible with respect to one quarter of the wavelength of the radar signals but, on the other hand, does not highly exceed a number of wavelengths, say, does not exceed twenty wavelengths (depending on the resistance), fibers of different lengths or conductive areas of different sizes should be used and may be obtained by breakage, as mentioned above. In the case of meshes, such meshes should be irregular in a manner basically known from merely optical camouflaging nets such as those disclosed in U.S. Pat. specification No. 2,825,168 granted to C.O.A. Ekman though at a different scale, or by using fine wires, metal foil strips or corresponding conductive (metallized) strips, which extend along diverging-converging or serpentine or similar paths so that meshes of various sizes and various reflective, directive, and absorptive properties are intermixed.

In other words, the absorption and/or reflection layer may consist either of a so-called aperiodic or "non-resonant" material responding substantially uniformly to different radar frequencies when disregarding the influence of the thickness of the layer on the response, or of periodic material, not quite correctly even referred to as resonant material.

When comparing mechanical dimensions with free-space wavelengths, it should be kept in mind that differences between mechanical and electrical lengths exist and are depending chiefly on the dielectric constant of the surrounding plastic or other material and the length-to-diameter ratio of fibrils or the width of the strips or wires forming a mesh, etc. Actually, the mechanical length is always slightly less than the corresponding electrical length.

Preferably, metal fibrils for use in accordance with the object of the invention should have a thickness (diameter) of not more than 15 microns, preferably not more than 12 and, more particularly, of 8 microns proved very advantageous. If metal-coated plastic or other synthetic fibers, or strips are used, the thickness may exceed the above values depending substantially on the type of synthetic material and the effective resistance of the metal coating which may be inhomogeneous so that uncoated areas, fissures and pores may remain and even may be desirable for the purposes of the present invention.

When using resonant periodic material comprising highly resonant elements such as resonant meshes or fibers having a high quality factor Q, attention may have to be paid to the fact that, in such a case, there are always quite a number of slightly detuned resonant elements, the number of which normally highly exceeds that of accurately tuned resonant portions. The camouflaging characteristic of such material is different for continuous waves and for pulsed radar waves and for radar or other waves transmitted with two slightly different frequencies. This difference is the result of considerable transients occurring in every resonance circuit and increasing with the Q factor thereof. A relatively low Q factor of, say, less than 10, is desirable both for said reason and for a broad frequency response but some resonance is normally desirable anyway for a desirable response of the camouflaging sheet. Metal fibrils may consist of aluminum or steel or even copper.

When using flakes, printed strips, grids, or nets, or metal foils, the material and thickness is substantially dependent on the conditions of producing the camouflage sheet and the concerned layers thereof. The metal layer of a printed or metallized surface may be as thin as possible such as between 1 and 20 microns. Flakes, net wires, or metal foils should preferably have a thickness of between 10 and 100 microns.

The above and other considerations as well as experiments have shown that satisfactory camouflage sheets comprising one single thin camouflaging layer may be made.

If "resonant" fibers or fibrils, flakes or meshes are used and if they are made or treated in the above way such that they exhibit different resonant properties, a kind of interradiation and inter-action within the layer itself may be obtained if the thickness of the layer is negligible in comparison with one quarter of the radar wavelength and is, for example, one millimeter or less. It is thus possible to create a both reflective and absorptive layer having the desired radar response within the whole practical radar frequency range between at least 1.5 cm and 15 cm, i.e. from 20 to 2 GHz, and particularly when the camouflaging sheet is three-dimensional in the manner disclosed in the above mentioned U.S. Pat. No. 3,069,796, so that inter-action occurs not only within the layer itself but also between parallel or considerable non-coplanar portions, and at the same time a very high optical camouflage is obtained also. Such inter-action is known from the so-called "window jamming" techniques though, in the present case the reflective elements such as fibrils are spread within a far more confined space and are more lossy and embedded in a more lossy material. The technique of "window jamming" involves jamming of radar sets by distributing from an aircraft sought to be detected by radar a very great number of resonant, or slightly detuned, tin foil strips in the atmosphere. Contrary to "window jamming", a high degree of absorption and a relatively low degree of reflection is desired. The primary effect of "window jamming", as well as that of the present camouflaging sheet, may be qualitatively understood when comparing "Yagi" reflecting, resonant and directive metal rods corresponding with the fibrils mentioned above and when considering the fictive case of a great number of said Yagi rods disarrayed and spread in a thick layer of plastics and having a non-negligible resistance.

Actually, the response of a flexible layer incorporating disarrayed fibrils, or irregular meshes or irregular or different form, or metal flakes of irregular size and form, particularly if said layer is three-dimensional by being embossed, provided with flaps, or by being an extended sheet structure referred to more above, is similar to that of a surface having an impedance, particularly a surface resistivity related to the characteristic impedance of free space (377 ohms) in the manner desired for radar camouflage. The term "surface resistivity" as it appears here and elsewhere in this specification is a technical one well known in the art and is defined in various technical dictionaries, one of which is "Electronics And Nucleonics Dictionary" 3rd Edition, authored by John Markus and published by the McGraw-Hill Book Company. Generally speaking it is the electrical resistance of the surface of a layer of a material, measured between the opposite sides of a square area thereof on the surface. The resistance value in ohms i.e. ohms per square is independent of the size of the square and the thickness of the layer. Such single camouflaging layer may, however, also be made in another way.

As noted above, the electrical resistance of a square surface of a layer of insulating material is independent of the size of the square. If, therefore, the surface resistivity $R_o$ is equal to the characteristic impedance $Z_o$ of free space or in other words is 377 ohms per square, all radar radiation would be absorbed and none reflected. The camouflaging material should reflect at least 10 percent of the incident radar power, i.e. its power reflection factor should be at least 10 percent which involves that the surface resistivity of the material must differ markedly from the value of 377 ohms/sq. If, for example, 30 percent of the incident radiation should be reflected, the matching ratio $Z_o/R_o$ or $R_o/Z_o$ should be 1.5 . Moreover, frequently the skin effect must not be entirely neglected even with the very thin films. At a frequency of 3 GHz (3000 MHz or 10 cms.) the skin depth is about 12 microns. Assuming a desired matching ratio of about 1.5, a continuous non-resonant metal film, for example, of copper, aluminum, steel, etc. must have a thickness being less than that on one atom as the diameter of atoms is between 1 and 5 A, for example, 2.56 A = 25.6 nm (nanometers or millimicrons). This theoretical limitation for normal metals though not for graphite may be circumvented, however, by using a metal film having many pores and holes of various sizes. Such a structure is obtained by well known processes of production which, normally, would be considered entirely unsatisfactory or bad for other purposes than the present one.

FIG. 1 shows multi-layer camouflaging sheet including an intermediate radar camouflaging layer and two outer layers.

FIGS. 2A, 2B and 2C show three different structures for the intermediate radar camouflaging layer of FIG. 1; and FIGS. 3 to 5 are concerned with prior art modified to incorporate the present invention.

FIG. 3 is a plan view of a camouflage sheet provided with an irregular pattern of U-shaped cuts.

FIG. 4 is a modification thereof as being provided with an approximately regular pattern of cuts, and FIG. 5 shows this sheet extended into a three-dimensional configuration. FIGS. 3, 4 and 5 correspond respectively to FIGS. 3, 1 and 4 of U.S. Pat. No. 3,069,796 — R. G. Ruter so far as overall configuration of the camouflage sheet is concerned but having no disclosure relative to the novel subject matter of the present application in the structure of the camouflage layer and more specifically its surface resistivity.

FIG. 1 shows a flexible camouflage means comprising two outer optically camouflaging layers 1 and 3 and an intermediate radar camouflaging layer 2a If required, also the outer layers may be made lossy for radar radiation by being made slightly conductive in a manner known per se, for example, by using a plastic material mixed with finely dispersed carbon black or metal powder such that the particles thereof are not entirely insulated from one another. A separate infra-red camouflaging layer (not shown) may be added.

The intermediate layer shown in FIG. 2A includes metal fibrils 4 or metallized fibers of synthetic material which are irregularly distributed in a solid or in a non-woven fabric such as so-called needle felt. The fibrils preferably are made of stainless steel, but also iron, normal steel, aluminum and copper fibrils may be used. The metal fibrils have a diameter of approximately 8 microns, or slightly more, and various lengths of about a half-wavelength within the desired radar wavelength interval of, say 1.5 to 30 cms., corresponding to an electrical length of the fibers between 7 and 16 cms. In the present example, the fibrils have a total length of about 300 to 500 meters per square meter of the sheet and an average spacing of approximately 5 mms. from one another. Of course, the majority of the fibrils are crossed by one or more other fibrils. In the considered wavelength region, the resistance of the fibrils is of the order of several tenths of kilo-ohms per meter length, and is estimated to be between about 40 and 80 kohm/m if the fibrils are made of steel but measurements proved difficult and unreliable. Apart from the inter-action such as internal reflection and absorption in the layer as described above, it appears reasonable that the intermediate layer 2a as well as those shown in FIGS. 2B and 2C also, or only, are effective in that the surface resistivity of the intermediate layer is correlated with that of the characteristic impedance of free space (377 ohms) such that the desired radar camouflaging effect is obtained in this way so that said surface resistivity would be of an order of about 220 ohms per square or 640 ohms per square which would have the same effect. Provided that the dimensions of the fibrils and of their spacing is not negligible with respect to one quarter of the radar wavelength, it is more or less a matter of definition whether the one or the other explanation is adopted. This applies equally to the examples B and C described below.

FIG. 2B shows another example of an intermediate layer 2b consisting of a solid synthetic material or of a fibrous woven or non-woven fabric and of very fine wires, metal covered synthetic fibers, or printed metal strips. The wires or strips form an irregular mesh of two sets of wires or strips, one comprising the horizontal wires 5 or strips in the drawing and the other set comprising the vertical wires 5' or strips. The points of crossing care electrical joints but may also be insulated if the resistance per unit length of the wires or strips is sufficiently high. Below, only crossings forming electrical joints are considered, though a very fine insulation between the crossing wires may form an electric joint too for radar frequencies. The meshes have individual shapes and sizes such that they are at resonance at different frequencies in the whole radar frequency region of, say, 2–20 or 1–20 GHz (1.5 to 15 or 30 cms.). The relationship between direct dielectric losses and interaction in the layer 2b will be different from that of a layer 2a according to FIG. 2A, but a similar final result may be obtained.

In FIG. 2C, a further example is shown which basically operates in the same way as that shown in FIG. 2B but the metallic part of the layer 2c is obtained by irregular or "bad" metallization of a substrate such as PVC so that pores and holes 6 of different size remain. The thickness of the layer may be only a few microns, or even a small fraction of a micron, depending upon the resistivity of the metal, the type of substrate, porosity, etc. If a sufficient number of holes satisfies the conditions mentioned above for the meshes of the layer shown in FIG. 2B, the layer will operate basically in the same way. The metallized areas of the layer may, however, be made such that almost all, or all of the holes in the metallization are so small that their dimensions are negligible with respect to one quarter of the radar wavelength. If, then the size, form and distribution of the holes or pores or short slots is such that the surface resistivity of the layer is of the order required for radar camouflaging, i.e., somewhere between 100 and 1000 ohms/sq., or, in normal the case, by approximately 220 or 640 ohms per square, the radar camouflaging effect may again be obtained.

In all of the above examples and cases it should be kept in mind that the general requirements on radar camouflage depend upon the object to be hidden, particularly on the size thereof, and upon the environments and even, to some extent, on the type of radar reconnaissance to be expected. Thus a 20 GHz (1.5 cm.) radar spotting the object at short range yields another picture than, say, a 10 cm. radar at a distance of tenths of kilometers or than a so-called twin-radar, etc. It should also be kept in mind that the phenomena resulting in the camouflaging effect in accordance with the object of the invention are far more intricate than roughly indicated above.

Practical experiments have shown that a sheet according to FIG. 1 having an intermediate layer of the type shown in FIG. 2A and being cut and extended to form a leaf-like netting, approximately as shown in FIGS. 3–5 is very effective. The fibrils were of steel having a diameter of approximately 8 microns. The steel fibrils formed part of a non-woven thin felt of polyamid fibers (nylon fibers), and the two outer layers shown in FIG. 1 were obtained by covering the felt with a thin PVC layer on each side thereof, the PVC layers being colored and prepared such as to camouflage optically and, probably together with the intermediate layer, even in the infrared range. The thickness of the sheet was that of thin board, i.e., approximately 0.4 mms, slightly varying and depending on external pressure, and the stiffness of the sheet was ideal for maintaining the extended three-dimensional form of a type as shown in FIG. 5.

Every camouflaging sheet according to the present invention may or normally even should be cut and extended to become three-dimensional, though, of course, there are cases where a two-dimensional sheet will quite suffice or is preferred, for example, for camouflage of highly reflective small objects and for protection against rainfall, snow and dust.

The arrangements shown in FIGS. 3 to 5 need not be explained in more detail and, as mentioned above, a combination of the present invention with that of U.S. Pat. No. 3,069,796 has considerable advantages since the measures for obtaining the three-dimensional optical effect improve also the radar camouflaging effect.

The results of experiments made with a number of camouflaging sheets or foils are given in the following table. The values of reflection were measured in the continuous wave band of 8.5 – 9.6 GHz, and the absorption and transmission were measured with a continuous wave of 9 GHz(3.33cm.). The measurements were made with plane, non-perforated sheets of the size A4, i.e., 21.0 × 29.7 cm. covering a damping material with the exception of the measurements of "Power reflection from target" which were made with perforated foils (nets) irregularly covering a target formed by an ellipsoidal silver-plated metal body, the three axes of which had respective lengths of 15.0, 22.5 and 30.0 cm., the values given in the table being that fraction of incident energy which is directly reflected from the target and through the foil again.

| Sheet No. | Polarization | Attenuation by transmission db | Power Absorption % | Power reflection from foil % | Power reflection from target % | db |
|---|---|---|---|---|---|---|
| 1 | 1 | 2.4 | 33 | 9 | | |
|  | 2 | 1.8 | 29 | 5.2 | | |
|  | MV | 2.1 | 31 | 7.1 | | |
|  |  |  |  |  | 0.05 | 26 |
| 2 | 1 | 5.3 | 35 | 34.5 | | |
|  | 2 | 7.0 | 62 | 17.6 | | |
|  | MV | 6.1 | 49 | 26.9 | | |
|  |  |  |  |  | 0.07 | 23 |
| 3 | 1 | 7.7 | 53 | 30 | | |
|  | 2 | 9.5 | 43 | 46 | | |
|  | MV | 8.6 | 49 | 38 | | |
|  |  |  |  |  | 0.08 | 22 |
| 4 | 1 | 9.3 | 43 | 44.5 | | |
|  | 2 | 14.5 | 31 | 65 | | |
|  | MV | 11.9 | 39 | 54.7 | | |
|  |  |  |  |  | 0.15 | 17 |
| 5 | 1 | 16.9 | 24 | 73.5 | | |
|  | 2 | 22.5 | 15 | 84 | | |
|  | MV | 19.7 | 20 | 78.7 | | |
|  |  |  |  |  | 0.17 | 15 |
| 6 | 1 & 2 | 0.75 | 15 | 1.4 | 0.03 | >30 |
| 7 | 1 & 2 | 0.45 | 9 | 0.8 | | |
| 8 | 1 | 10.7 | 38 | 53 | 0.10 | 20 |
|  | 2 | 4.7 | 43 | 22 | | |
|  | MV | 7.7 | 47 | 37.5 | | |

For the above noted series of tests, sheets Nos. 1, 2 and 3 comprised one intermediate layer of polyester needle felt having a total weight of 80 g/m² doped with steel fibrils having a diameter of 8 microns and a length of 30 mm.; the fibrils in sheet No. 1, constituted 1 percent, by weight (0.7g/m²) of the layer;those in sheet No. 2, 2 percent (1.6 g/m²); and those in sheet No. 3, 4 percent (3.2 g/m²).

Sheets Nos. 4 and 5 were a normal cotton plain cloth (two-thread twill) including respectively 2 and 5 percent by weight of the above-mentioned steel fibrils having a diameter of about 8 microns and a length of 30 mms.

Sheet No. 6 was a foil with a printed conductive grid having meshes of 3 × 3 mm open area and formed of metal layer strips of a width of 2 mm.

Sheet No. 7 was also a foil, similar to sheet No. 6 except that the strip width was 1 mm and the open mesh areas measured 4 × 4 mm.

Sheet No. 8 was a metallized cloth, being metallized with nickel and provided with a thin layer of PVC.

It is not, of course, possible to obtain more than a coarse general information from the above table because the effects of varying viewing and scanning angles and the reproduction on a radar screen cannot be properly reproduced in the present application papers such that absolute judgment of the camouflage would be possible.

In the above table, it should be noted that sheet Nos. 1 to 5 include many resonant or semi-resonant fibrils or meshes, whereas, sheets Nos. 6 to 8 are non-resonant. General tests indicated that the quality of the camouflage did not considerably vary in the whole wavelength region between 1.5 and 15 cm corresponding to the frequency range from 20 to 2 GHz.

The experiments and tests heretofore mentioned with respect to a three-layer sheet (of the type shown in FIG. 2 consisting of two outer PVC optical camouflaging layers and an intermediate radar camouflage layer of the type described and illustrated in FIG. 2a, the intermediate layer being a non-woven polyester fabric having steel fibrils of approximately 9 microns in diameter embedded therein, and the sheet being cut and extended to form a leaf-like three-dimensional netting approximately as shown in FIG. 5), were made with a radar reflector buoy, consisting of hollow cube corners, having an equivalent reflecting area of 300 square meters. The buoy was mounted at a 1 meter distance above the ground on a flat meadow and was covered entirely with the camouflaging sheet. The data of the side looking radar set were: frequency — 9200 MHz; power — 22 KW; pulse length — 0.3 microseconds; aerial gain 37 db; polarization — linear, vertical; aerial lobe angle 2.4° both vertically and horizontally (circular cross-section); distance from radar source to target 3850 meters. The measured average power absorption was between 6.8 and 7.5 db corresponding to a power reflection of 21.3 and 17.8 percent respectively.

I claim:

1. Camouflage means for minimizing detection of objects by radar reconnaissance which comprises a multi-layered sheet of flexible material comprising a single electrically resistive layer and another layer of substantially insulating material, said electrically resistive layer being constituted by a thin inhomogeneous electrically conductive film having, at radio frequencies exceeding 2000 MHz, a surface resistivity falling between a lower limit of 100 ohms and an upper limit of 1,000 ohms but considerably different from 377 ohms to ensure partial reflection from the object of at least 10 percent of the incident radar power.

2. Camouflage means as defined in claim 1 wherein the surface resistivity of said electrically conductive film is about 220 ohms.

3. Camouflage means as defined in claim 1 wherein the surface resistivity of said electrically conductive film is about 640 ohms.

4. Camouflage means as defined in claim 1 wherein said electrically conductive film is an extremely fine metal film exhibiting pores and apertures to render the effect surface resistivity of the layer by one or more orders higher than the surface resistivity of a homogeneous layer of the same material and thickness.

5. Camouflage means as defined in claim 4 wherein substantially all of said apertures have dimensions which are negligible with respect to one quarter of the wavelength of the radar signals.

6. Camouflage means as defined in claim 1 wherein said electrically conductive film is a conductive metallic grid.

7. Camouflage means as defined in claim 6 wherein said conductive metallic grid is irregular such that the meshes forming the apertures therein differ in form and size, the plurality of meshes having dimensions which are not negligible with respect to one quarter of the wavelength of the radar signals.

8. Camouflage means as defined in claim 6 wherein said conductive metallic grid is substantially regular and the meshes forming the apertures therein have dimensions which are negligible with respect to one quarter of the wavelength of the radar signals.

9. Camouflage means as defined in claim 1 wherein said electrically conductive film is approximately uniform and is composed of finely distributed conductive particles having the character of discrete colloidal particles which have a relatively low resistivity of the order of that of graphite.

10. Camouflage means as defined in claim 1 wherein said electrically conductive film comprises short, non-spun, unwoven fibers having a metallic surface and wherein the majority of the fibers has a length which is not negligible with respect to one quarter of the wavelength of the radar signals.

11. Camouflage means as defined in claim 10 wherein said fibers consist of a metal and have a thickness of approximately less than 15 microns.

12. Camouflage means as defined in claim 10 wherein said fibers consist of monofilous synthetic fibers covered with an electrically conductive film.

13. Camouflage means as defined in claim 1 wherein said flexible material is constituted by a flat, substantially two-dimensional flexible sheet having a plurality of cuts therein of such length and distribution over the sheet that when the sheet is subjected to a pull, the extended sheet becomes three-dimensional, the length of each cut exceeding one quarter of the wavelength of the radar signals.

14. Camouflage means as defined in claim 13 wherein the cuts in said sheet are curved and interlocked with each other such that the ends of the cuts terminate within the fields defined by adjacent substantially oppositely disposed curved cuts such that when the cut out areas extend beyond the plane of the sheet, said areas have their greatest dimension exceeding a half wavelength of the radar signals which have a frequency higher than 2000 MHz.

* * * * *